United States Patent
Shen et al.

(10) Patent No.: US 12,420,854 B1
(45) Date of Patent: Sep. 23, 2025

(54) STEERING WHEEL ASSEMBLY

(71) Applicant: Autoliv Development AB, Vargarda (SE)

(72) Inventors: Nan Shen, Shanghai (CN); Xinli Wang, Shanghai (CN); Wei Zhu, Shanghai (CN); Lei Zhou, Shanghai (CN)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/861,457

(22) PCT Filed: Apr. 7, 2023

(86) PCT No.: PCT/CN2023/086887
§ 371 (c)(1),
(2) Date: Oct. 29, 2024

(87) PCT Pub. No.: WO2023/207552
PCT Pub. Date: Nov. 2, 2023

(30) Foreign Application Priority Data

Apr. 29, 2022 (CN) .......................... 202210466334.2

(51) Int. Cl.
*B62D 1/04* (2006.01)
*B60K 35/22* (2024.01)

(52) U.S. Cl.
CPC .............. *B62D 1/046* (2013.01); *B60K 35/22* (2024.01); *B60K 2360/782* (2024.01)

(58) Field of Classification Search
CPC ........ B62D 1/105; B62D 1/046; B60K 35/22; B60K 2360/782; H01R 35/025
See application file for complete search history.

(56) References Cited

U.S. PATENT DOCUMENTS

| | | | |
|---|---|---|---|
| 10,199,787 B2* | 2/2019 | Schroer | B60R 16/027 |
| 10,952,322 B2* | 3/2021 | Hengel | H01R 12/716 |
| 10,953,791 B2* | 3/2021 | Lisseman | B60Q 3/80 |

(Continued)

FOREIGN PATENT DOCUMENTS

| | | |
|---|---|---|
| CN | 1926012 A | 3/2007 |
| CN | 108346384 A | 7/2018 |

(Continued)

*Primary Examiner* — Jake Cook
(74) *Attorney, Agent, or Firm* — Matthew D. Thayne; Thayne and Davis LLC

(57) ABSTRACT

A steering wheel assembly including a steering wheel, a transmission member, and an electronic device, wherein the transmission member is configured to transmit torque between the steering wheel and a steering column; the steering wheel includes a steering wheel center portion and a steering wheel rim surrounding the steering wheel center portion, the steering wheel rim is provided with an electrical element, and the electronic device is provided at the steering wheel center portion and remains stationary when the steering wheel is rotated; and a clock spring unit is provided below the electronic device and includes a first connection terminal connected to the electronic device, a second connection terminal connected to the electrical element, and a third connection terminal connected to a vehicle, wherein the clock spring unit includes an inner clock spring part and an outer clock spring part surrounding the inner clock spring part.

16 Claims, 3 Drawing Sheets

(56) References Cited

U.S. PATENT DOCUMENTS

2005/0017482 A1    1/2005   Kreuzer et al.
2007/0099465 A1    5/2007   Ruetz
2016/0185354 A1    6/2016   Lisseman et al.

FOREIGN PATENT DOCUMENTS

CN    112124217 A    12/2020
DE    10214607 A1    10/2003
JP    2019059436 A    4/2019

\* cited by examiner

STEERING WHEEL ASSEMBLY

TECHNICAL FIELD

The present invention relates to accessories for vehicles, and relates in particular to a steering wheel assembly.

BACKGROUND

With the development of the vehicle industry, as an important component in a steering system, a steering wheel is not only used for a steering function, but is also expected to have additional functions. For example, it is desired that a vehicle steering wheel is able to generate heat to provide a more comfortable driving experience when a driving operation is performed in a cold environment. For another example, in order to improve safety, a hands-off detection function is provided on the steering wheel to detect whether a driver is in a hands-off state and to issue a warning when it is detected that the driver is in the hands-off state. In addition, various other functions such as audio control, cruise control, Bluetooth connection, a trip computer, and the like may be provided on the steering wheel, and these other functions may be presented to the driver by a display device located at the center of the steering wheel. Each of the above functions requires signal transmission between a corresponding component mounted on the steering wheel and the vehicle.

Current steering wheels rotate with a steering column as an assembly on the steering column. Such a steering wheel-steering column configuration does not allow various components (e.g., the display device) mounted on the steering wheel to remain stationary with respect to the vehicle during rotation of the steering wheel, which is disadvantageous for components that are required to remain stationary at all times without rotation (for example, rotation will result in an inability to operate the functions), thereby not supporting a plurality of functions to be equipped on the steering wheel.

Therefore, it is desired to provide a steering wheel that supports a plurality of functions to be equipped on the steering wheel.

SUMMARY

It is an object of the present invention to provide a steering wheel assembly which supports a plurality of functions to be equipped on a steering wheel. In particular, the steering wheel assembly of the present invention can support a plurality of functions (e.g., audio control, cruise control, Bluetooth connection, trip computer, multimedia, etc.) integrated on the display device at the center of the steering wheel, which is achieved by keeping the display device stationary relative to the vehicle during rotation of the steering wheel.

The present invention provides a steering wheel assembly, comprising a steering wheel, a transmission member, and an electronic device,
wherein,
the transmission member is configured to transmit torque between the steering wheel and a steering column;
the steering wheel comprises a steering wheel center portion and a steering wheel rim surrounding the steering wheel center portion, the steering wheel rim is provided with an electrical element, and the electronic device is provided at the steering wheel center portion and remains stationary when the steering wheel is rotated; and
a clock spring unit is provided below the electronic device, and comprises a first connection terminal connected to the electronic device, a second connection terminal connected to the electrical element, and a third connection terminal connected to a vehicle, and
wherein the clock spring unit comprises an inner clock spring part and an outer clock spring part surrounding the inner clock spring part, the inner clock spring part is provided with the first connection terminal and remains stationary when the steering wheel is rotated, and the outer clock spring part is provided with the second connection terminal and rotates together with the steering wheel when the steering wheel is rotated.

According to an embodiment of the present invention, the clock spring unit is located between the electronic device and the transmission member in an axial direction of the steering wheel, and comprises a first frame for mounting the inner clock spring part, and the first frame is fixed to a stationary part of the transmission member.

According to an embodiment of the present invention, the first frame comprises a base and a columnar portion protruding from the base, and the inner clock spring part is provided with a receiving portion for the columnar portion to pass through, and is fixed to the base.

According to an embodiment of the present invention, the inner clock spring part comprises a first side surface facing the base, and the first side surface is provided with a positioning portion for positioning relative to the base and a fixing portion for fixing to the base.

According to an embodiment of the present invention, the base is provided with a mating positioning portion that mates with the positioning portion, one of the positioning portion and the mating positioning portion is provided as a positioning pin, and the other is provided as a positioning hole; and/or,
the fixing portion is configured as a threaded hole.

According to an embodiment of the present invention, a torque transmission portion is provided between a steering wheel frame of the steering wheel and the outer clock spring part for transmitting torque therebetween.

According to an embodiment of the present invention, the torque transmission portion comprises a torque transmission hole and a torque transmission pin inserted into the torque transmission hole, the torque transmission pin being provided on one of the steering wheel frame and the outer clock spring part and the torque transmission hole being provided on the other.

According to an embodiment of the present invention, the electronic device is fixed to the first frame and configured as a display device.

According to an embodiment of the present invention, the electronic device comprises a mounting plate fixed to the first frame and a display, and a vibration reduction unit is provided between the display and the mounting plate.

According to an embodiment of the present invention, a hook portion is provided on a bottom side of the display, the hook portion passing from an upper side of the mounting plate and being fixed to a lower side of the mounting plate by means of a spring.

According to an embodiment of the present invention, the vibration reduction unit comprises a vibration reduction body provided between the display and the mounting plate, and the vibration reduction body is provided with a vibration reduction portion that is softer than the vibration reduction body.

According to an embodiment of the present invention, the vibration reduction body is further provided with a first stopper portion for limiting a moving distance of the display relative to the mounting plate.

According to an embodiment of the present invention, the mounting plate is provided with a fixing hole, and a fixing pin can pass through the fixing hole and a hole of the steering wheel center portion to fix a position of the clock spring unit in a circumferential direction relative to the steering wheel before the steering wheel assembly is mounted on a vehicle; and/or, a second stopper portion for limiting the moving distance of the display relative to the mounting plate is provided on the bottom side of the display, and is aligned with the vibration reduction portion in the axial direction of the steering wheel.

According to an embodiment of the present invention, a rubber sleeve is further provided between the torque transmission hole and the torque transmission pin.

According to an embodiment of the invention, the electrical element comprises a first electrical element for hands-off detection and/or a second electrical element for steering wheel heating.

According to an embodiment of the present invention, the third connection terminal is provided on the inner clock spring part.

BRIEF DESCRIPTION OF THE DRAWINGS

The features, advantages, and technical effects of exemplary embodiments of the present invention will be described below with reference to the accompanying drawings. In the accompanying drawings, the same reference numbers denote the same elements, where.

DETAILED DESCRIPTION

Figure 1:
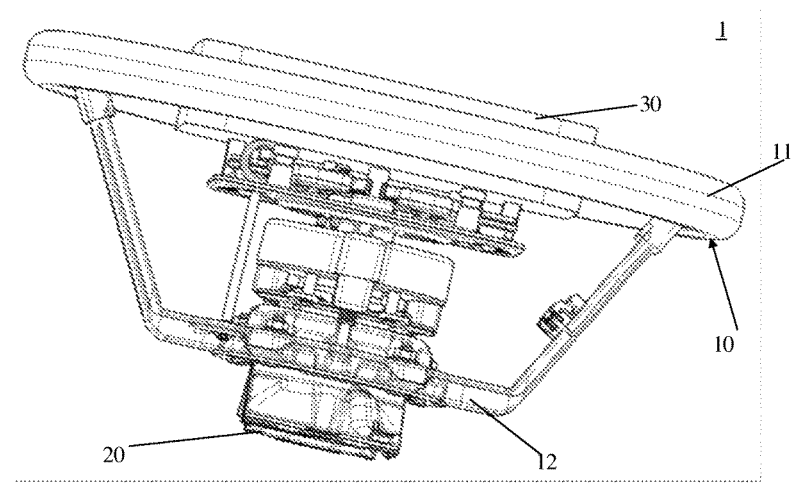
FIG. 1 shows a three-dimensional view of a steering wheel assembly according to an embodiment of the present invention.

Specific embodiments of a steering wheel assembly according to the present invention will be described below with reference to the accompanying drawings. The following detailed description and the accompanying drawings are used to illustratively explain the principles of the present invention. The present invention is not limited to the described preferred embodiments, and various embodiments described in the present invention can be used individually or in any combination. The scope of protection of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

Figure 2:
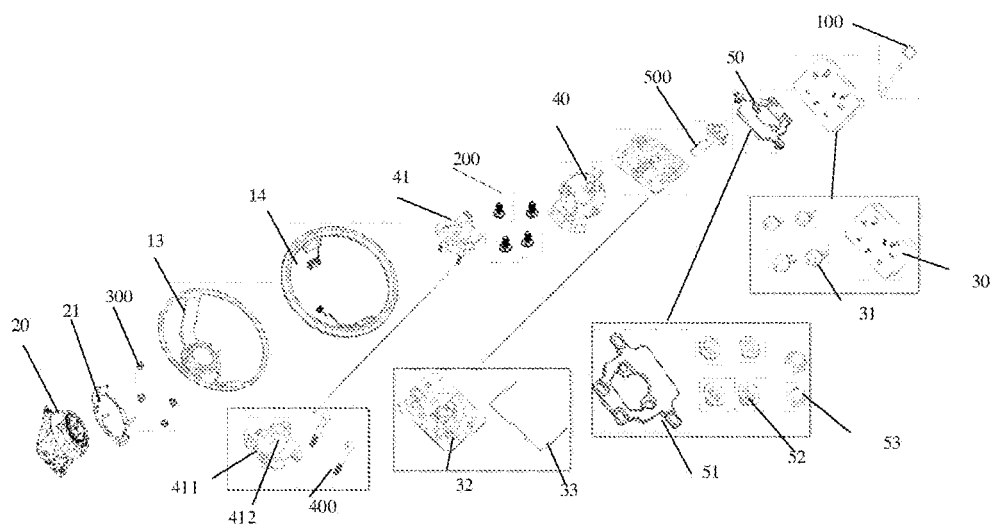
FIG. 2 shows an exploded view of the steering wheel assembly according to the embodiment of the present invention.

FIG. 1 shows a three-dimensional view of a steering wheel assembly according to an embodiment of the present invention. FIG. 2 shows an exploded view of the steering wheel assembly according to the embodiment of the present invention. The steering wheel assembly according to the embodiment of the present invention will be described below with reference to FIGS. 1 and 2.

As shown in FIGS. 1 and 2, the steering wheel assembly 1 provided by the present invention includes a steering wheel 10, a transmission member 20, and an electronic device 30. The steering wheel 10 includes a steering wheel rim 11 and a steering wheel center portion 12, and the steering wheel rim 11 is arranged around the steering wheel center portion 12. Generally, the steering wheel 10 further includes a plurality of radial members extending substantially in a radial direction thereof to connect the steering wheel rim 11 and the steering wheel center portion 12. It can be observed from FIG. 2 that two radial members are shown in the present embodiment. Of course, this is only an example, and the steering wheel assembly of the present invention may be provided with other numbers of radial members according to practical requirements.

The transmission member 20 is configured to transmit torque between the steering wheel 10 and a steering column (not shown), for example, between the steering wheel center portion 12 of the steering wheel 10 and the steering column, thereby transmitting torque applied to the steering wheel 10 by a driver to the steering column to perform a steering operation of a vehicle. The transmission member 20 shown in FIG. 2 includes a flange. A bolt on a bracket 21 passes through the flange and fixes the two together by means of a nut 300, and thereafter, they will be fixed at a predetermined position on the vehicle.

Furthermore, as shown in FIG. 2, the steering wheel assembly 1 of the present invention further includes an electrical element 14. In an embodiment, the electrical element 14 is configured to be in an annular shape to adapt to the shape of an annular portion of the steering wheel frame 13, thereby quickly covering the annular portion and being provided at the steering wheel rim 12 accordingly. Of course, the electrical element 14 provided at the steering wheel rim 12 will rotate together with the steering wheel 10 when the steering wheel 10 is rotated. The electronic device 30 is provided at the steering wheel center portion 12. In the steering wheel assembly 1 of the present invention, the electronic device 30 is provided to remain stationary when the steering wheel 10 is rotated. This means that the electronic device 30 is provided at the steering wheel center portion 12 while always remaining as components separated from each other in terms of movement with respect to the steering wheel, thereby ensuring that the electronic device 30 is not affected by the rotation of the steering wheel, which will be described in more detail below.

Also, in FIG. 2, a clock spring unit 40 included in the steering wheel assembly 1 of the present invention is further shown. The clock spring unit 40 is provided below the electronic device 30. In other words, the electronic device 30 and the clock spring unit 40 are stacked one on top of the other in an axial direction of the steering wheel 10. For example, the clock spring unit 40 may be located between the electronic device 30 and the transmission member 20 to separately provide signal transmission between the electrical element 14 and the vehicle, and between the electronic device 30 and the vehicle.

Figure 3:
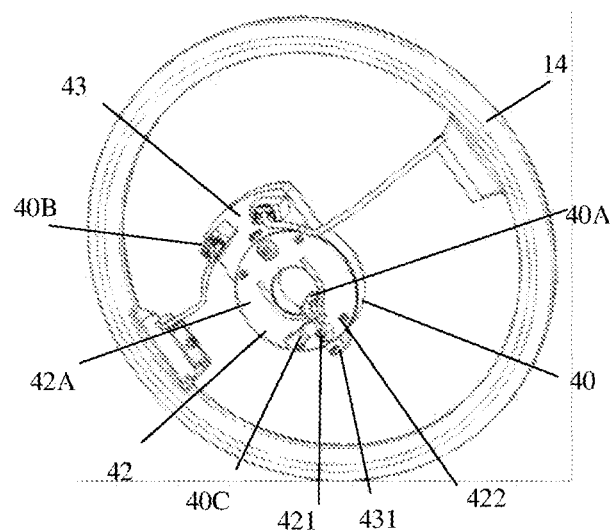
FIG. 3 shows a schematic view of a clock spring unit in the steering wheel assembly according to the embodiment of the present invention.
Figure 4:
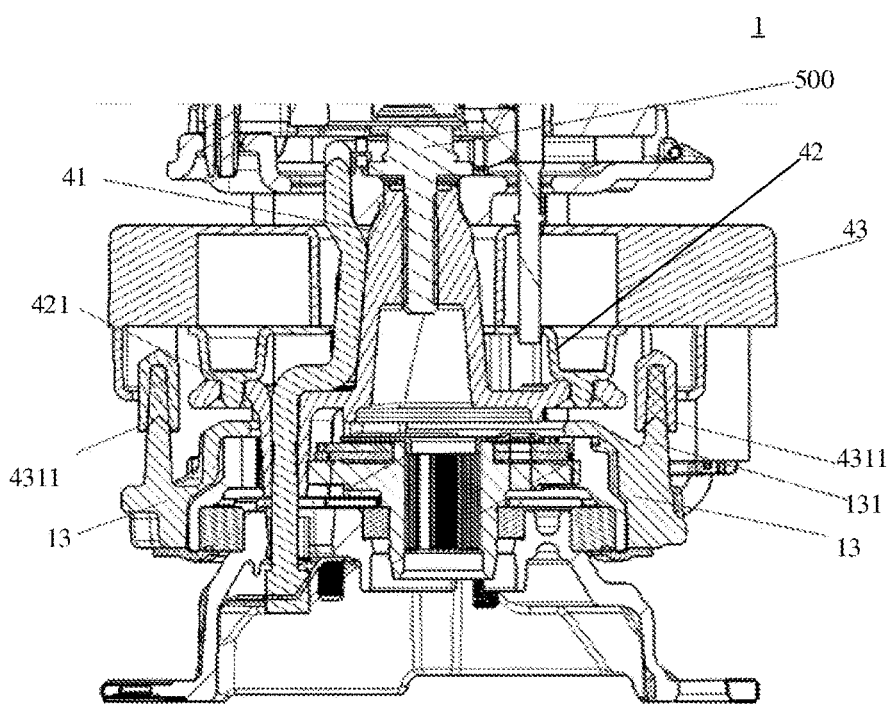
FIG. 4 shows a cross-sectional view of the steering wheel assembly according to the embodiment of the present invention.

FIG. 3 shows a schematic view of the clock spring unit in the steering wheel assembly according to the embodiment of the present invention. FIG. 4 shows a cross-sectional view of the steering wheel assembly according to the embodiment of the present invention. An exemplary clock spring unit 40 will be described in detail below with reference to FIGS. 2, 3, and 4.

As shown in FIG. 2, the clock spring unit 40 includes a first frame 41 for mounting a clock spring. The first frame 41 is in a substantially conical shape, and is fixed to the bracket 21 (which always remains stationary and is fixed to the flange of the transmission member 20 by a nut 300) of the transmission member 20 by means of a bolt 400. Moreover, specifically, the first frame 41 includes a base 411 and a columnar portion 412 protruding from the base 411. As shown in FIG. 3, the clock spring unit 40 includes a first connection terminal 40A connected to the electronic device 30, a second connection terminal 40B connected to the electrical element 14, and a third connection terminal 40C connected to the vehicle, wherein the first connection terminal 40A passes through a through-hole from a front surface of the clock spring unit 40 shown in FIG. 3 to a rear surface of the clock spring unit 40, and thus, it is only partially visible. Furthermore, the clock spring unit 40 includes an inner clock spring part 42 and an outer clock spring part 43 surrounding the inner clock spring part. The two clock spring parts are allowed to rotate relative to each other, and specifically, the outer clock spring part is able to rotate relative to the inner clock spring part. The inner clock spring part 42 is provided with the above-mentioned through-hole for the columnar portion to pass through, and the first connection terminal 40A passing through the through-hole. The third connection terminal 40C is also provided on the inner clock spring part 42 in the present embodiment. Of course, this is merely exemplary, and a plurality of third connection terminals may be provided. For example, a dedicated third connection terminal is provided for each first connection terminal and each connection terminal. In the meantime, the outer clock spring part 43 is provided with the second connection terminal 40B. In the present embodiment, two second connection terminals 40B are provided on the outer clock spring part 43. The two are shown on the outer clock spring part 43 in FIG. 3 in a left-right arrangement. For example, the electrical element 14 includes a first electrical element for hands-off detection and a second electrical element for steering wheel heating, and correspondingly, the two second connection terminals 40B are used for signal transmission for both functions of hands-off detection and steering wheel heating, respectively. Of course, this is merely an example, and the electrical element may also include other types of elements such as heart rate detection, vibration motors, lighting, buttons, etc.

In the present invention, the outer clock spring part 43 is provided so as to rotate together with the steering wheel 10 when the steering wheel 10 is rotated, and the inner clock spring part 42 is provided so as to be fixed together with the first frame 41 and thus remain stationary when the steering wheel 10 is rotated.

The fixing of the inner clock spring part and the outer clock spring part will be separately described below.

The through-hole as described above on the inner clock spring part 42 serves as a receiving portion for the columnar portion 412 of the first frame 41 to pass through so that at least a part thereof is thereafter received therein. Furthermore, the inner clock spring part 42 includes a first side surface 42A (i.e., a front surface shown in FIG. 3) facing the base 411. Positioning portions 421 (shown as two in number) and fixing portions 422 (shown as four in number) are provided on the first side surface 42A. The positioning portions 421 are used for positioning the inner clock spring part 42 relative to the base 411, and the fixing portions 422 are used for fixing the inner clock spring part 42 to the base 411. It can be understood that, except the through-hole for receiving the first frame, located at the center position, no through-hole can be provided at other positions of the clock spring unit due to wire harness contained therein, and therefore, the above-mentioned fixing structure in combination with the positioning structure will facilitate easy fixing of the inner clock spring part.

Figure 6A:
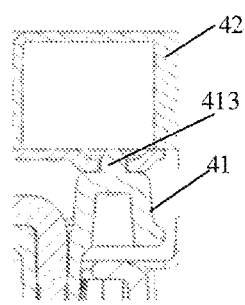
FIGS. 6(*a*) and 6(*b*) show partial cross-sectional views of a steering wheel assembly according to another embodiment of the present invention.
Figure 6B:
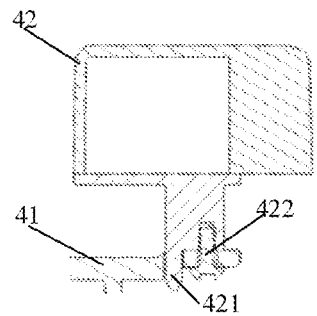

In an example, as shown in FIGS. 3 and 4, the base 411 of the first frame 41 is provided with a mating positioning portion that mates with the positioning portion 421. Moreover, the positioning portion 421 is configured as a positioning pin, and the mating positioning portion is provided as a positioning hole that mates with the positioning pin. The fixing portion 422 protrudes from the first side surface 42A of the inner clock spring part 42 and is configured as a threaded hole. The threaded hole mates with a bolt 422 to fix the inner clock spring part 42 to the first frame 41, and is provided in a protruding portion that protrudes from the first side surface 42A. Of course, the steering wheel assembly of the present invention is not limited to the above-described example. For example, FIGS. 6(a) and 6(b) show alternative embodiments. In FIG. 6(a), the positioning portion is configured as a positioning hole, and the mating positioning portion 413 is provided as a positioning pin. In FIG. 6(b), the positioning portion 421 is configured as a positioning pin, the mating positioning portion is provided as a positioning hole, and the fixing portion 422 is recessed relative to the first side surface of the inner clock spring part and configured as a threaded hole.

Figure 5A:
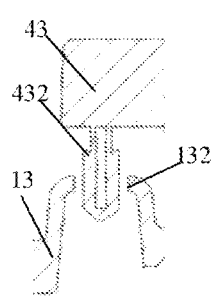
FIGS. 5(*a*), 5(*b*), and 5(*c*) show partial cross-sectional views of a steering wheel assembly according to another embodiment of the present invention.
Figure 5B:
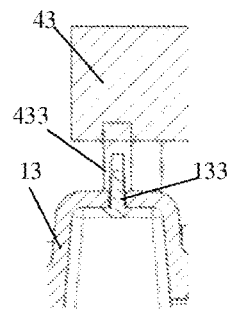
Figure 5C:
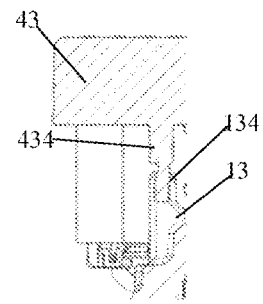

In an example, as shown in FIGS. 3 and 4, a torque transmission portion is provided between the steering wheel frame 13 and the outer clock spring part 43 for transmitting torque therebetween. Specifically, the torque transmission portion includes a torque transmission hole 431 and a torque transmission pin inserted into the torque transmission hole 431. The torque transmission pin is provided on the steering wheel frame 13, and the torque transmission hole 431 is provided on the outer clock spring part 43. Of course, the steering wheel assembly of the present invention is not limited to the above-described example. For example, FIGS. 5(a), 5(b), and 5(c) show alternative embodiments. In FIG. 5(a), an alternative torque transmission pin 432 is provided on the outer clock spring part 43, and an alternative torque transmission hole 132 is provided on the steering wheel frame 13. In FIG. 5(b), another alternative torque transmission pin 433 is provided on the outer clock spring part 43, and has an expanded end capable of preventing the outer clock spring part 42 from moving in an upward direction to disengage from the steering wheel frame 13, and another alternative torque transmission hole 133 is provided on the steering wheel frame 13. In FIG. 5(c), a further alternative torque transmission pin 434 is provided on the outer clock spring part 43, and the torque transmission portion further includes a groove 134 that mates with the further alternative torque transmission pin 434 described above, the groove being provided at an outer edge of the steering wheel frame 13. Of course, any structure capable of transmitting torque may be used in the outer clock spring part and/or the steering wheel frame of the present invention.

As an embodiment of the present invention, a rubber sleeve 4311 is further provided between the torque transmission hole and the torque transmission pin, which can reduce noise during torque transmission and wear of the steering wheel frame and the outer clock spring part, as shown in FIG. 4.

The steering wheel assembly according to the embodiment of the present invention will be further described below with reference to FIGS. 1 and 2.

As an example, the electronic device 30 is configured as a display device and is fixed on the first frame 41 by means of a bolt 500, so that the display device remains stationary during the rotation of the steering wheel. Specifically, the electronic device 30 includes a mounting plate 32. The mounting plate 32 is fixed to the first frame 41 by means of the bolt 500, which is shown in FIG. 4. A columnar portion 412 of the first frame 41 is of a hollow structure and provided with a threaded hole on an inner surface thereof to mate with the bolt 500. The electronic device 30 further includes a display, and a hook portion is provided on a bottom side of the display, the hook portion passing from an upper side of the mounting plate 32 and being fixed to a lower side of the mounting plate 32 by means of a spring 33.

Further, a vibration reduction unit 50 is provided between the display and the mounting plate 32 to reduce vibrations around the display during use, thereby protecting the display. In the present embodiment, the vibration reduction unit 50 includes a vibration reduction body 51 provided between the display and the mounting plate 32, and the vibration reduction body 51 is provided with a vibration reduction portion 52 which is softer than the vibration reduction body 51. The vibration reduction portion 52 is detachably mounted to the vibration reduction body 51 as a separate part with respect to the vibration reduction body 51, and a plurality of vibration reduction portions 52 may be provided at a plurality of different positions of the vibration reduction body 51 according to space or other special requirements. The vibration reduction body 51 is further provided with a first stopper portion 53 for limiting the moving distance of the display relative to the mounting plate 32. Correspondingly, a second stopper portion 31 for limiting the moving distance of the display relative to the mounting plate 32 is provided on the bottom side of the display, and is aligned with the vibration reduction portion 52 in the axial direction of the steering wheel 11 to simultaneously serve as a pre-positioning portion to position the display relative to the mounting plate.

As an example, as shown in FIGS. 1 and 2, a fixing pin 100 is provided, a fixing hole is provided on the mounting plate, and the fixing pin 100 can pass through the fixing hole and a hole of the steering wheel center portion to fix the position of the clock spring unit in the circumferential direction with respect to the steering wheel before the steering wheel assembly is mounted to a vehicle (for example, during transportation).

It should be noted that, in the steering wheel assembly of the present invention, the clock spring unit is provided as an inner clock spring part and an outer clock spring part surrounding the inner clock spring part; the inner clock spring part remains stationary when the steering wheel is rotated, and the outer clock spring part is rotated together with the steering wheel when the steering wheel is rotated; and the two spring parts are respectively provided with connection terminals for the needs of signal transmission at different positions of the steering wheel. Therefore, the above arrangement in particular allows the electronic device at the steering wheel center portion to remain stationary when the steering wheel is rotated, while allowing the electrical element at the steering wheel rim to rotate with the steering wheel when the steering wheel is rotated. The steering wheel assembly of the present invention is particularly beneficial when the electronic device is a display device (including, but not limited thereto. It may also be other electronic devices that are similarly not desirable to rotate with the steering wheel), as the display device needs to provide a plurality of functions while being always stationary relative to the vehicle without rotating. Therefore, the steering wheel assembly of the present invention can support a plurality of functions to be equipped on the steering wheel.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A steering wheel assembly, comprising a steering wheel, a transmission member, and an electronic device, wherein:
   the transmission member is configured to transmit torque between the steering wheel and a steering column;
   the steering wheel comprises a steering wheel center portion and a steering wheel rim surrounding the steering wheel center portion, the steering wheel rim is provided with an electrical element, and the electronic device is provided at the steering wheel center portion and remains stationary when the steering wheel is rotated; and
   a clock spring unit is provided below the electronic device, and comprises a first connection terminal connected to the electronic device, a second connection terminal connected to the electrical element, and a third connection terminal connected to a vehicle,
   wherein the clock spring unit comprises an inner clock spring part and an outer clock spring part surrounding the inner clock spring part, the inner clock spring part is provided with the first connection terminal and remains stationary when the steering wheel is rotated, and the outer clock spring part is provided with the second connection terminal and rotates together with the steering wheel when the steering wheel is rotated.

2. The steering wheel assembly according to claim 1, wherein the clock spring unit is located between the electronic device and the transmission member in an axial direction of the steering wheel, and comprises a first frame for mounting the inner clock spring part, and the first frame is fixed to a stationary part of the transmission member.

3. The steering wheel assembly according to claim 2, wherein; the first frame comprises a base and a columnar portion protruding from the base, and the inner clock spring part is provided with a receiving portion for the columnar portion to pass through, and is fixed to the base.

4. The steering wheel assembly according to claim 3, wherein; the inner clock spring part comprises a first side surface facing the base, and the first side surface is provided with a positioning portion for positioning relative to the base and a fixing portion for fixing to the base.

5. The steering wheel assembly according to claim 4, wherein, the base is provided with a mating positioning portion that mates with the positioning portion, one of the positioning portion and the mating positioning portion is provided as a positioning pin, and the other is provided as a positioning hole; and/or, the fixing portion is configured as a threaded hole.

6. The steering wheel assembly according to claim 1, wherein; a torque transmission portion is provided between a steering wheel frame of the steering wheel and the outer clock spring part for transmitting torque therebetween.

7. The steering wheel assembly according to claim 6, wherein, the torque transmission portion comprises a torque transmission hole and a torque transmission pin inserted into the torque transmission hole, the torque transmission pin being provided on one of the steering wheel frame and the outer clock spring part and the torque transmission hole being provided on the other.

8. The steering wheel assembly according to claim 2, wherein; the electronic device is fixed to the first frame and is configured as a display device.

9. The steering wheel assembly according to claim 8, wherein; the electronic device comprises a mounting plate fixed to the first frame and a display, and a vibration reduction unit is provided between the display and the mounting plate.

10. The steering wheel assembly according to claim 9, wherein, a hook portion is provided on a bottom side of the display, the hook portion passing from an upper side of the mounting plate and being fixed to a lower side of the mounting plate by means of a spring.

11. The steering wheel assembly according to claim 10, wherein; the vibration reduction unit comprises a vibration reduction body provided between the display and the mounting plate, and the vibration reduction body is provided with a vibration reduction portion that is softer than the vibration reduction body.

12. The steering wheel assembly according to claim 11, wherein; the vibration reduction body is further provided with a first stopper portion for limiting a moving distance of the display relative to the mounting plate.

13. The steering wheel assembly according to claim 12, wherein; the mounting plate is provided with a fixing hole, and a fixing pin can pass through the fixing hole and a hole of the steering wheel center portion to fix a position of the clock spring unit in a circumferential direction relative to the steering wheel before the steering wheel assembly is mounted on a vehicle; and/or, a second stopper portion for limiting a moving distance of the display relative to the mounting plate is provided on the bottom side of the display, and is aligned with the vibration reduction portion in the axial direction of the steering wheel.

14. The steering wheel assembly according to claim 7, wherein; a rubber sleeve is further provided between the torque transmission hole and the torque transmission pin.

15. The steering wheel assembly according to claim 1, wherein; the electrical element comprises a first electrical element for hands-off detection and/or a second electrical element for steering wheel heating.

16. The steering wheel assembly according to claim 1, wherein the third connection terminal is provided on the inner clock spring part.

* * * * *